United States Patent [19]

Anderson et al.

[11] 4,408,270

[45] Oct. 4, 1983

[54] STORED CHARGE INVERTER CIRCUIT WITH RAPID SWITCHING

[75] Inventors: Thomas E. Anderson; Alvin A. Bush; John Giorgis, Jr., all of South Euclid, Ohio

[73] Assignee: General Electric Company, Schenectady, N.Y.

[21] Appl. No.: 284,016

[22] Filed: Jul. 16, 1981

[51] Int. Cl.³ .......................................... H02M 7/537
[52] U.S. Cl. .................................. 363/132; 315/219; 363/134
[58] Field of Search ............. 363/17, 56, 98, 132–134; 315/219; 323/289

[56] References Cited

U.S. PATENT DOCUMENTS

| | | | |
|---|---|---|---|
| 2,971,166 | 2/1961 | Schultz | 331/113 |
| 3,105,944 | 10/1963 | Lostetter | 363/132 |
| 3,263,122 | 7/1966 | Genuit | 315/209 |
| 3,331,987 | 7/1967 | Powell | 315/206 |
| 3,482,145 | 12/1969 | Powell | 315/206 |
| 4,051,426 | 9/1977 | Wood | 363/131 |
| 4,259,614 | 3/1981 | Kohler | 363/133 |

FOREIGN PATENT DOCUMENTS 739699  6/1980  U.S.S.R. ............................. 363/132

OTHER PUBLICATIONS

Conference, PESC '80 IEEE Power Electronics Specialists Conference, Atlanta, Ga., USA, pp. 147–154, (Jun. 16–20, 1980).

Conference PESC '81 IEEE Power Electronics Specialists Conference, Boulder, Co., USA, pp. 252–257, (Jun. 29–Jul. 3, 1981), S18080011.

Primary Examiner—William H. Beha, Jr.
Attorney, Agent, or Firm—Norman C. Fulmer; Philip L. Schlamp; Fred Jacob

[57] ABSTRACT

An inverter circuit having two pairs of transistors, the transistors of each pair thereof being connected in series to alternately and repetitively apply electrical energy to an inductive load such as a fluorescent lamp. A square wave voltage is applied in opposite phase to electrodes of a first transistor of each pair thereof for rendering them alternately in condition for conduction and non-conduction. Each time a first transistor of one pair thereof becomes nonconductive, current in the inductive load reduces and an inductively induced flyback voltage is generated therein, which voltage is applied to the base electrode of the second transistor of the other pair thereof for creating a stored charge which turns on this transistor and keeps it on during the half-cycle, whereby the pairs of transistors are alternately turned on and off for applying alternating current through the load. Rapid discharge circuits are provided for the removal of residual stored charges.

17 Claims, 5 Drawing Figures

STORED CHARGE INVERTER CIRCUIT WITH RAPID SWITCHING

CROSS-REFERENCE TO RELATED APPLICATIONS

Ser. No. 184,648, filed Sept. 5, 1980, Thomas E. Anderson et al, "Stored Charge Inverter Circuit," assigned the same as this invention.

Ser. No. 257,742, abandoned, filed Apr. 27, 1981, Thomas E. Anderson, "Three-Phase Discharge Lamp Circuit," assigned the same as this invention.

BACKGROUND OF THE INVENTION

The invention is in the field of inverter circuits employing transistors as switches for producing a-c output energy from d-c input energy.

A widely used type of inverter circuit, known as a half-bridge inverter, has a pair of transistors, the emitter of one of the transistors and the collector of the other transistor being connected together to form a junction point, the remaining emitter and collector being respectively connected to terminals of a d-c electrical power source. A load (such as a lamp, motor, induction heater or other suitable device) is connected between the aforesaid junction point and the junction point of two capacitors connected in series across the power source. The transistors are alternately driven to full conduction at a repetitive frequency rate of about 1 kHz or higher, by means of drive currents alternately applied to their base electrodes, thus passing an alternating current through the load from the power source. The aforesaid drive currents may be square waves or sine waves, of sufficient amplitude to drive the transistors quickly to full conduction whereby they add substantially no resistance in the power current path and thus do not consume and dissipate any appreciable electrical power.

U.S. Pat. No. 4,051,426 to Wood discloses an inverter circuit of the type just described, and also discloses an undesirable "stored charge" characteristic of transistors which can cause both of the inverter transistors to be conductive at the same time and produce an undesirable short circuit across the power source, known as "shoot-through". The patent also teaches a way of connecting diodes in the circuit to alleviate the problem.

The first above-referenced Anderson et al patent application, which is incorporated herein by reference thereto, is directed to a circuit which makes advantageous use of stored charges in inverter transistors. The stored charges are produced from inductively induced flyback current in a load which is inductive or partly inductive. Each time one of the transistors is turned off, the flyback current, which is induced by declining current in the load, is applied to the base electrode of the other transistor to create a stored charge for turning it on and keeping it on during a half-cycle of operation. Thus the transistors are alternately conductive and apply alternating current through the load.

SUMMARY OF THE INVENTION

Objects of the invention are to provide an improved inverter circuit, and to provide a rapid switching inverter circuit that makes constructive use of the stored charge characteristic of transistors.

The invention comprises, briefly and in a preferred embodiment, an inverter circuit having two pairs of transistors, the transistors of each pair thereof having their collector and emitter electrode paths connected in electrical series aiding to alternately and repetitively apply electrical energy to a load which is inductive or has an inductive component, such as one or more fluorescent lamps transformer-coupled to the circuit. A square wave voltage or current control signal is applied in opposite phase to electrodes (such as base and emitter) of a first transistor of each pair thereof for rendering them alternately in condition for conduction and nonconduction. Each time a first transistor of one pair thereof becomes nonconductive, current in the load is turned off and as it reduces in value an inductively induced flyback voltage and current are generated therein, which are applied to the base electrode of the second transistor of the other pair thereof for creating a stored charge therein which turns on this transistor and keeps it on during the half-cycle its associated first transistor is turned on, whereby the pairs of transistors are alternately turned on and off for applying alternating current through the load. The arrangement provides rapid switching which produces a good square wave voltage waveform across the load, thus achieving excellent electrical efficiency. This rapid switching is achieved because each time one of said first transistors is in the process of being turned off, it is opening the emitter path of the associated second transistor thus diverting its collector current through the base and rapidly discharging the residual stored charge whereby this second transistor is turned off extremely rapidly. The invention can be used in various types of inverters, such as push-pull, half-bridge, and full-bridge inverters.

DESCRIPTION OF THE PREFERRED EMBODIMENTS

Figure 1:
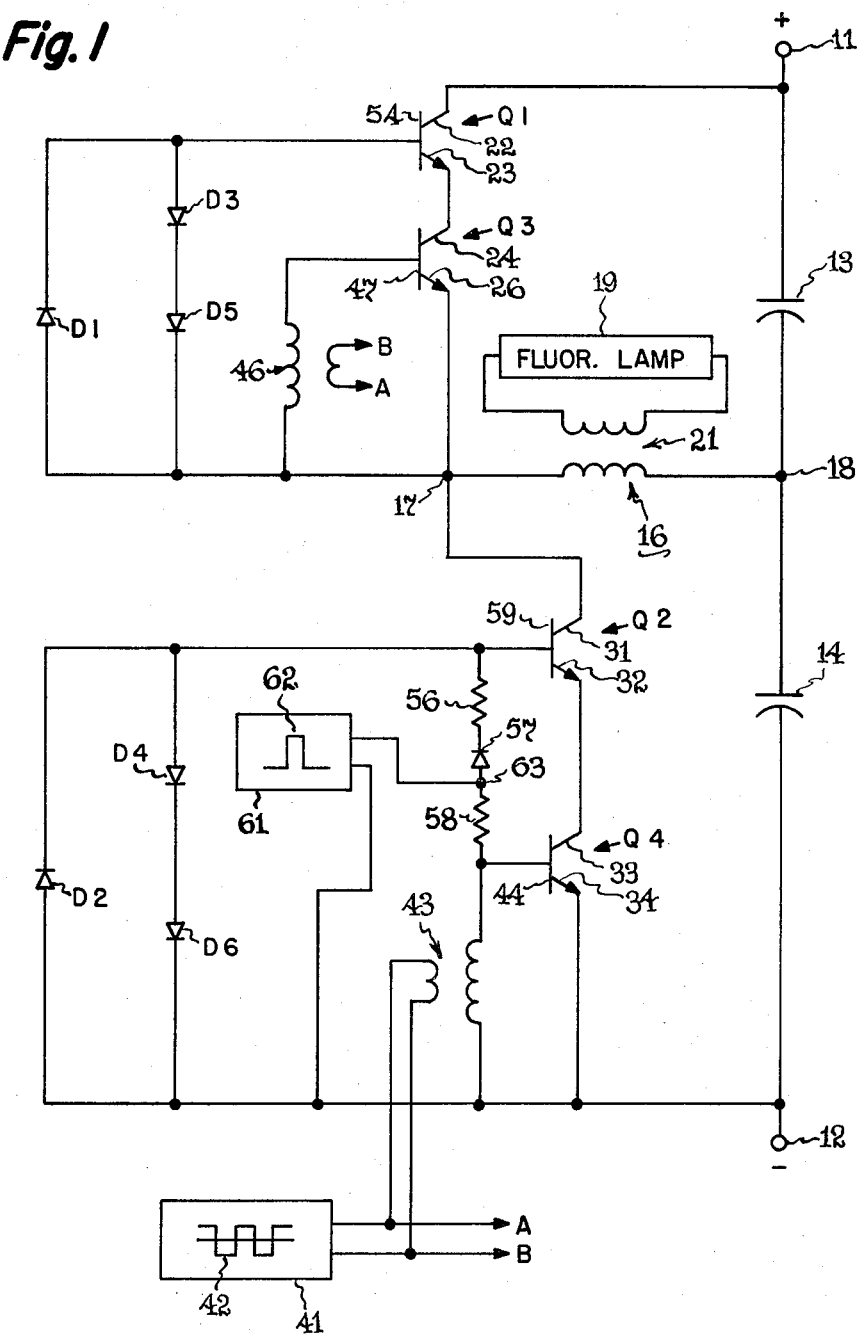
FIG. 1 is a schematic diagram of a preferred embodiment of the invention in a half-bridge inverter.

In FIG. 1, d-c electrical power input terminals 11 and 12 receive positive and negative polarity power, respectively, from a d-c power source which may be a rectifier type of power supply for deriving d-c power from a household or commercial a-c power source, such as a typical bridge rectifier and filter capacitor type of power supply, or a three-phase rectified power supply as is disclosed in the above-referenced Anderson patent application filed Apr. 27, 1981. A pair of capacitors 13, 14 are connected in series across the terminals 11 and 12. A load 16 is connected between a circuit point 17 and the junction 18 of capacitors 13, 14. The load 16 is inductive or has an inductive component, such as a gas discharge lamp, motor, inductive heating unit, etc., and may include a transformer coupling. If the load per se is not inductive, the required inductive component can be provided by a coupling transformer or other suitable means. In FIG. 1 the load 16 is shown as one or more fluorescent lamps 19 coupled between circuit points 17 and 18 by means of a transformer 21.

A first pair of transistors Q1 and Q3 have their output electrodes connected in series between power input terminal 11 and circuit point 17. More specifically, the collector 22 of Q1 is connected to terminal 11, and its emitter 23 is connected to the collector 24 of Q3, of which the emitter 26 is connected to circuit point 17. Similarly, a second pair of transistors Q2 and Q4 have their output electrodes connected in series between circuit point 17 and terminal 12; more specifically, the collector 31 of Q2 is connected to circuit point 17 and its emitter 32 is connected to the collector 33 of Q4, of which the emitter 34 is connected to terminal 12. Transistors Q3 and Q4 function similarly and are herein designated the "first" transistors of each pair, and transistors Q1 and Q2 function similarly and are herein designated the "second" transistors of each pair.

The output of a source 41 of square wave control voltage or current signal 42, preferably at a frequency of 20 kilohertz or higher, is coupled, via a transformer 43, between the emitter 34 and base 44 of transistor Q4 and also is coupled, via a transformer 46, between the emitter 26 and base 47 of transistor Q3. The connections to the transformers 43 and 46 are made so that the control voltage 42 is applied to the transistors Q3 and Q4 in opposite phases so as to render them in a condition to be alternately and repetitively conductive; i.e., when Q3 is in condition to be "on", Q4 is "off," and vice versa.

A resistor 56, diode 57, and resistor 58 are connected in series and in the order named between the base 59 of transistor Q2 and base 44 of transistor Q4, the cathode of diode 57 being toward base 59. The output of a source 61 of a single starting pulse 62 is connected to one of the transistors Q1 or Q2; as shown, it is connected to Q2 and more specifically is connected between the emitter 34 of transistor Q4 and the junction 63 of diode 57 and resistor 58. The starting pulse 62 may be synchronized with the control voltage or current 42 so as to render transistor Q2 conductive at a time when Q4 is rendered conductive; thereafter, as will be described, Q2 (and also Q1) are rendered periodically conductive by means of stored charges obtained from flyback current in the load 16. Starting pulse 16 would also render Q4 conductive if the control signal 42 had not commenced. Diode 57 functions to block a flow of current from the base path of Q2 which will be described subsequently. Components the same as resistors 56, 58 and diode 57 can be provided between base 54 of Q1 and base 47 of Q3 if identical upper and lower halves of the circuit are desired, for example if they are integrated circuits or if a choice is desired of applying the starting pulse 62 to Q1 or to Q2. A diode D1 is connected between circuit point 17 and the base 54 of Q1, with its cathode toward base 54, and a pair of nonlinear devices such as transistors or dioes D3, D5 are connected in series between these same points, with their anodes toward base 54. Similarly, a diode D2 is connected between voltage input terminal 12 and the base 59 of Q2, with its cathode toward base 59, and a pair of nonlinear devices such as transistors or diodes D4, D6 are connected in series between these same points, with their anodes toward base 59.

Figure 3:
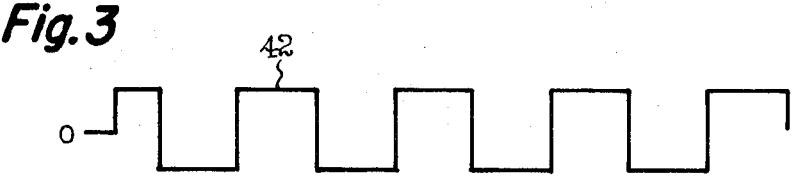
FIG. 3 is a time-plot showing of certain signals, voltage, and current in the circuits of FIGS. 1 and 2 when operating.
Figure 3:
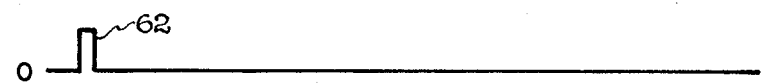
Figure 3:
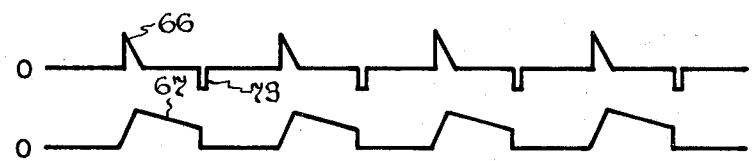
Figure 3:
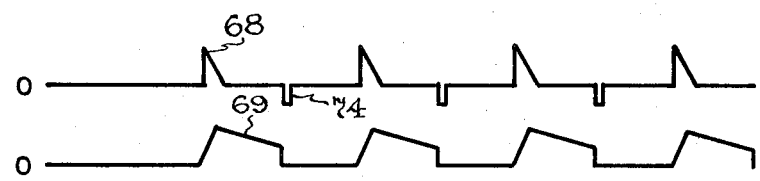
Figure 3:
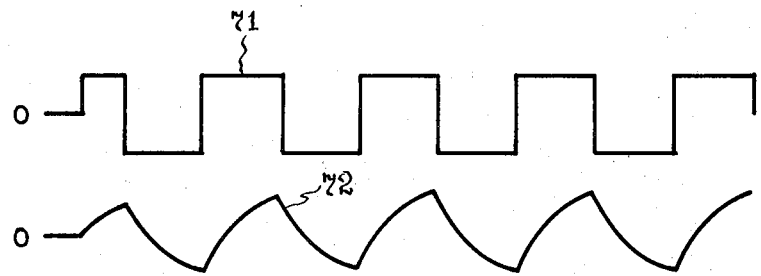

The circuit of FIG. 1 functions as follows, with reference to the electrical waveshapes shown in FIG. 3. The turn-on pulse 62, which may be of shorter time duration than the individual square waves 42, occurs in synchronization with the square waves 42 such as to cause transistor Q2 to turn on and be conductive at the same time Q4 is conductive. As explained above, starting pulse 62 would also turn on Q4 if the control signal 42 had not commenced. The turn-on pulse 62 can be of very short time duration and can terminate prior to termination of the first square wave half-cycle applied to Q4, as is shown in the drawing, because a stored charge is induced in Q2 by the turn-on pulse 62 which maintains Q2 conductive during the time Q4 is conductive, as is more fully disclosed in the first above-referenced patent application. While Q2 and Q4 are thus conductive, current flows from the positive terminal 18 through load 16, and Q2 and Q4 to the negative terminal 12. Upon polarity reversal of the control voltage of the square wave 42, transistor Q3 is rendered in condition to be conductive, and Q4 is rendered nonconductive whereby the current is interrupted in the load 16; however, stored energy in the inductive component of the load produces a "flyback" and current of positive polarity which passes through the diode D1 to the base 54 of transistor Q1. This flyback-induced current pulse 66 in base 54 renders transistor Q1 fully conductive. During this time Q1 operates as an inverted transistor where the base-collector junction becomes the emitter and the base-emitter junction becomes the collector. A charge 67 is stored in Q1 during this time. When the inductive energy has dissipated the stored charge keeps the transistor Q1 conductive, so that current now flows from terminal 11 through the transistors Q1, Q3, load 16, to terminal 18, the current in the load being in the opposite direction to that of current flow when transistors Q2 and Q4 conduct. The stored charge 67 partly drains off, as shown by curve 67; however, the frequency of the square wave control signal is chosen sufficiently high (20 kilohertz, for example) so that the stored charge is effective in maintaining conduction of the transistor during the half cycle of the square wave. When the square wave 42 next renders transistors Q3 and Q1 non-conductive, and terminates the load current, stored energy in the inductive component of the load 16 produces a flyback voltage and current 68 (of negative polarity at circuit point 17) which is conducted through the collector-base junction of transistor Q2, and diode D2, and which is the equivalent of a positive-polarity pulse 68 applied to the base 59, as shown in the drawing, which renders transistor Q2 again conductive, operating in an inverted mode, and creates a stored charge 69 in the transistor which maintains the transistor in a fully conductive state until the next half-cycle of the square wave. The process is repetitive and applies a square wave of voltage 71 across the load 16 which causes an alternating current 72 to flow in the load 16.

In accordance with the invention, the switching speed is increased by causing the pairs of transistors to switch off at an increased rate of speed. Transistors do not turn on and off instantly; there is a certain time required, for example a few microseconds or milliseconds, for changing from non-conduction to full conduction, and vice versa. Transistor turn-off time is slowed due to the above-described stored charge tending to keep it conductive. The circuit of the invention minimizes this problem by connecting the diodes D3, D5 and D4, D6 to the bases of transistors Q1 and Q2, respectively, and by opening the emitter current paths of Q1 and Q2 by means of the switching control transistors Q3 and Q4. Assume that Q1 and Q3 are conducting during a half cycle of circuit operation, whereupon the control voltage 42 drives the base 47 of Q3 negative, to turn off Q3. As Q3 is turning off, its current diminishes and its collector-to-emitter impedance increases, causing the voltage of the electrodes of Q1 to rise toward the positive voltage at terminal 11; when the rising voltage at the base 54 reaches the turn-on conduction level of diodes D3 and D5 they become conductive and divert Q1 current through the base 54 as shown by curve 73. This current 73 flows from terminal 11 through the collector-base path 22, 54 of Q1, the diodes D3, D5, and load 16 and to terminal 18. This surge of negative base current quickly "dumps" the residual stored charge out of the base 54 of Q1, as indicated by numeral 67 in FIG. 3 whereby Q1 turns off very rapidly. During this "dumping" action, the entire collector 22 current flows through base 54 and none flows through emitter 23, which aids in speeding the turn-off of Q1. This current flow ceases upon depletion of the stored charge. When Q1 is fully off, the pair of transistors Q1, Q3 is fully off. Similarly, when Q4 is being turned off, its collector-to-emitter impedance increases, causing the voltage of the electrodes of Q2 to rise toward the voltage of circuit point 17, and the diodes D4, D6 become conductive and a surge of current 74 flows through the collector-base path 31, 59 and quickly "dumps" the residual stored charge, as indicated by numeral 69 in FIG. 3, whereby Q2 turns off very rapidly and terminates the current flow through the pair of transistors Q2, Q4. The "dumping" current pulses 73, 74 last a very short time, such as about one microsecond. The number of diodes D3, D5 and D4, D6 employed in series depends on the desired turn-on point for the stored charge dumping action.

The just described rapid turn-off switching helps insure that both transistors of a pair are turned off (or at least one of the transistors is turned off) by the time the other pair of transistors is turned on for the next half-cycle of operation. It would be unfortunate if all four transistors Q1, Q2, Q3, Q4 were conductive simultaneously, even for a moment, because they would form a short circuit across the terminals 11, 12 and damaging current could flow. This is the undesirable "shoot-through" described in the above-referenced Wood patent.

Figure 2:
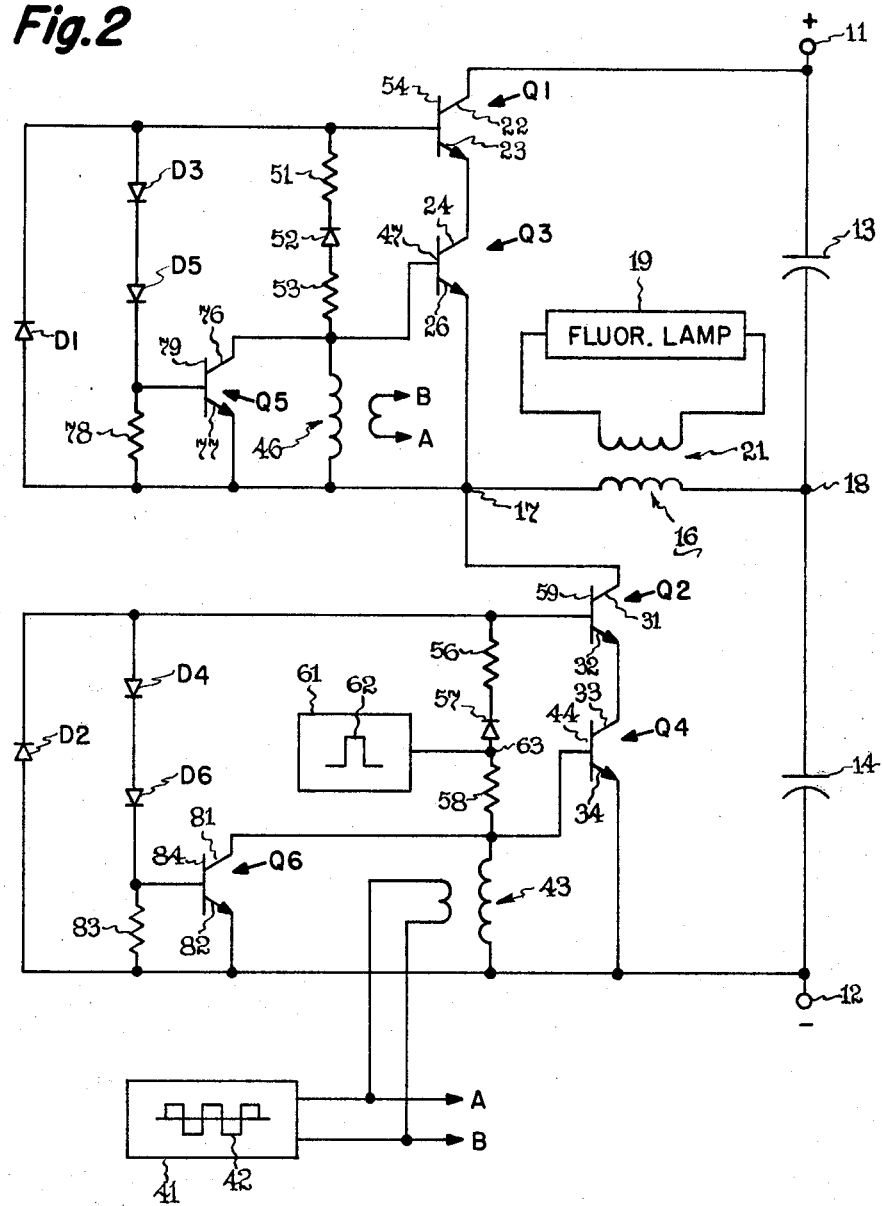
FIG. 2 is a schematic diagram of an alternative preferred embodiment in a half-bridge inverter.

FIG. 2 is similar to FIG. 1, and has clamping transistors Q5 and Q6 added. Q5 has collector and emitter electrodes 76 and 77 respectively connected to the base 47 and emitter 26 of Q3. A resistor 78 is interposed in series with diodes D3, D5 and across the base 79 and emitter 77 of Q5. Similarly, Q6 has collector and emitter electrodes 81, 82 respectively connected to the base 44 and emitter 34 of Q4, and a resistor 83 is interposed in series with diodes D4, D6 and across the base 84 and emitter 82 of Q6. FIG. 2 functions as described above for FIG. 1, and additionally the clamping transistors Q5 and Q6 function as follows. During the aforesaid times when the stored charges are being "dumped" from base 54 of Q1, the bias voltage across resistor 78 renders Q5 conductive and its collector 76 and emitter 77 clamp across base 47 and emitter 26 of Q3 to insure its complete turn-off and preventing it from undesireably becoming conductive or partly conductive in the event of a spurious transient voltage spike in the control signal 42. Q6 functions similarly when stored charges are dumped from base 59 of Q2.

Figure 4:
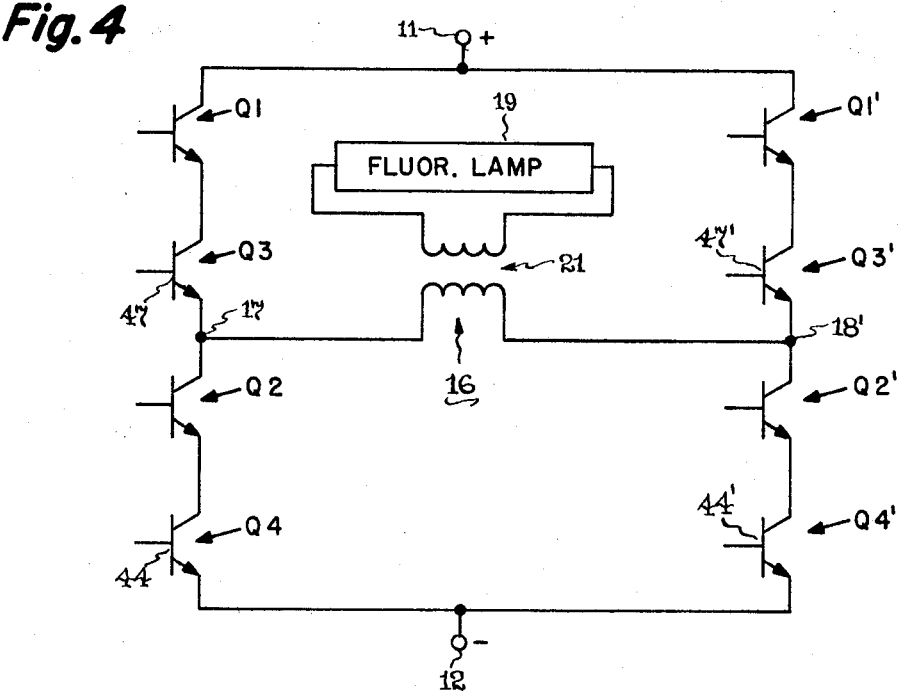
FIGS. 4 and 5 are illustrative schematics of the invention respectively in a full-bridge inverter and in a push-pull inverter.
Figure 5:
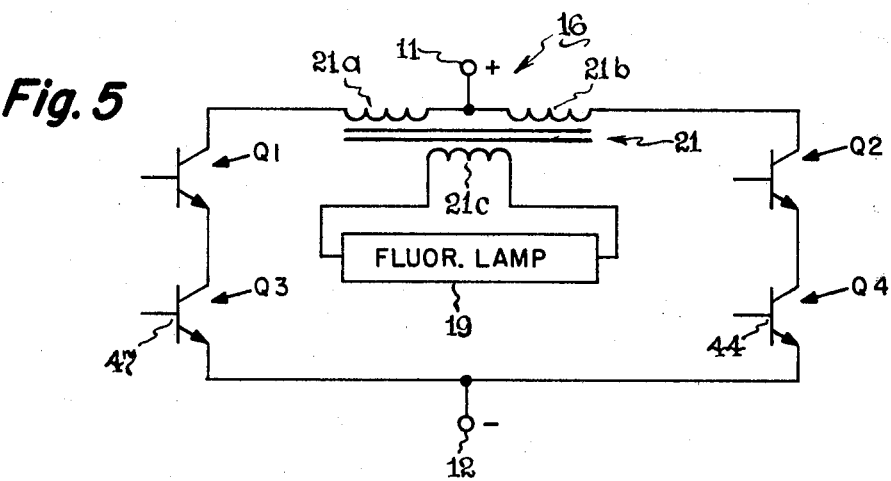

The above-described circuits of FIGS. 1 and 2 utilize the invention in a half-bridge inverter. FIGS. 4 and 5 illustrate the invention utilized in a full-bridge inverter and in a push-pull inverter, respectively. In FIG. 4, first and second pairs of transistors Q1, Q3 and Q2, Q4 are connected in series between the input power terminals 11, 12 as in FIGS. 1 and 2. Similar additional pairs of transistors Q1', Q3', and Q2', Q4' are similarly connected in series between the input power terminals 11, 12 and take the place of the capacitors 13, 14 in FIGS. 1 and 2. The load 16 is connected between the junction 17 of the first and second pairs of transistors and the junction 18' of the additional pairs of transistors. The circuitry (not shown) connected to the pairs of transistors Q1, Q3 and Q1', Q3', etc. may be similar or identical to that shown in FIG. 1 or FIG. 2. The square wave control signal 42 is applied to base 47 of Q3, base 47' of Q3', base 44 of Q4, and base 44' of Q4', in proper phasing so that the pairs Q1, Q3, and Q2', Q4' are conductive simultaneously (while the remaining transistors are non-conductive) so that alternate half-cycles of current flow from terminal 11 and through Q1, Q3, load 16, and Q2', Q4' to terminal 12, and during the remaining half-cycles the pairs Q1', Q3' and Q2, Q4 are conductive so that current flows from terminal 11 and through Q1', Q3', load 16, and Q2, Q4 to terminal 12. Thus an alternating current is caused to flow through the load 16 and through the load device 19.

In the push-pull inverter of FIG. 5, the power input terminal 11 is connected to a center tap of the primary winding of transformer 21, dividing it into a first half 21a and a second half 21b. The primary half 21a and transistors Q1, Q3 are connected in series between the power input terminals 11, 12, and the primary half 21b and transistors Q2, Q4 are connected in series between the power input terminals 11, 12. The load device 19 is connected across the secondary winding 21C of transformer 21. The circuitry (not shown) connected to the pairs of transistors Q1, Q3 and Q2, Q4 may be similar or identical to that shown in FIG. 1 or FIG. 2. The square wave control signal 42 is applied to base 47 of Q3 and to base 44 of Q4 in opposite phase so that Q1 and Q3 are rendered conductive when Q2 and Q4 are nonconductive, and vice versa. During the half-cycles when Q1 and Q3 are conductive, current flows in the primary half 21a, and current induced in the secondary 21c flows in the load device 19 in a given direction. During the other half-cycles when Q2 and Q4 are conductive, current flows in the primary half 21b and in the load device 19 in the opposite direction. Thus an alternating current is caused to flow through the load device 19.

While preferred embodiments and modifications of the invention have been shown and described, various other embodiments and modifications thereof will become apparent to persons skilled in the art and will fall within the scope of the invention as defined in the following claims.

What we claim as new and desire to secure by United States Letters Patent is:

1. An inverter circuit for operating from a d-c power source and applying alternating current through a load which is inductive or has an inductive component, comprising first and second pairs of transistors connected to alternately apply current through said load from said power source, each said pair of transistors comprising first and second transistors having their collector-emitter paths connected in serires between an end of said load and a terminal of said d-c power source, a source of alternating control signal voltage connected in opposite phases to said first transistors to enable them to be sequentially conductive, said second transistors having the characteristic of storing a charge applied to their control electrodes, and said load having the characteristic of inducing a flyback current when current flow therein is terminated, means connected between said load and said control electrodes of the second transistors for applying the flyback current resulting from the turn-off of each of said first transistors through the base-collector path of the second transistor of the other pair thereof for causing it to operate as an inverted transistor and rendering it conductive and storing a charge therein to keep it conductive for a period of time, said circuit being devoid of any other source of repetitive turn-on pulses for said second transistors.

2. A circuit as claimed in claim 1, including means for applying a turn-on pulse to one of said second transistors for rendering it conductive and initiating operation of the circuit.

3. A circuit as claimed in claim 1, including means for applying a turn-on pulse simultaneously to the first and second transistors of one of said pairs thereof for rendering them conductive and initiating operation of the current.

4. A circuit as claimed in claim 1, in which said means for applying flyback current to the second transistors comprises one or more nonlinear devices.

5. A circuit as claimed in claim 4, in which said nonlinear devices are diodes.

6. A circuit as claimed in claim 1, in which said alternating control signal has a square waveshape.

7. A circuit as claimed in claim 1, including means connected to the base electrodes of each of said second transistors for drawing current through the collector-base path thereof and dumping said stored charge each time the associated first transistor is turning off.

8. A circuit as claimed in claim 7, in which the last named means comprises one or more nonlinear devices.

9. A circuit as claimed in claim 8, in which said nonlinear devices are diodes.

10. A circuit as claimed in claim 1 or 7, including a pair of clamp transistors each having collector and emitter electrodes connected to the base and emitter electrodes of a respective one of said first transistors, and means for rendering each clamp transistor conductive during each switching off of the said first transistor to which it is connected.

11. A circuit as claimed in claim 1 or 7, in which said inverter circuit is a half-bridge inverter, said collector-emitter paths of the pairs of transistors being respectively connected in series between one and the same end of said load and respectively different terminals of said power source.

12. A circuit as claimed in claim 11, including a pair of capacitors connected in series between said power source terminals, the remaining end of said load being connected to the junction of said capacitors.

13. A circuit as claimed in claim 1 or 7, in which said inverter circuit is a full-bridge inverter, said collector-emitter paths of the pairs of transistors being respectively connected in series between one and the same end of said load and respectively different terminals of said power source, said circuit including third and fourth pairs of transistors each comprising first and second transistors having their collector-emitter paths connected in series, means connecting said third and fourth pairs of transistors in series between said power source terminals, means connecting the remaining end of said load to the junction of said third and fourth pairs of transistors, and means applying said alternating control signal in opposite phases to said first transistors of the third and fourth pairs thereof whereby said pairs of transistors are rendered conductive in a synchronized sequence to cause alternating current to flow through said load.

14. A circuit as claimed in claim 1 or 7, in which said inverter circuit is a push-pull inverter, said load comprising two halves connected in series, one of said power terminals being connected to the junction of said load halves, said first pair of transistors being connected between the remaining end of one of said load halves and the remaining power terminal, and said second pair of transistors being connected between the remaining end of the other one of said load halves and said remaining power terminal.

15. A circuit as claimed in claim 10, in which said inverter circuit is a half-bridge inverter, said collector-emitter paths of the pairs of transistors being respectively connected in series between one and the same end of said load and respectively different terminals of said power source.

16. A circuit as claimed in claim 10, in which said inverter circuit is a full-bridge inverter, said collector-emitter paths of the pairs of transistors being respectively connected in series between one and the same end of said load and respectively different terminals of said power source, said circuit including third and fourth pairs of transistors each comprising first and second transistors having their collector-emitter paths connected in series, means connecting said third and fourth pairs of transistors in series between said power source terminals, means connecting the remaining end of said load to the junction of said third and fourth pairs of transistors, and means applying said alternating control signal in opposite phases to said first transistors of the third and fourth pairs thereof whereby said pairs of transistors are rendered conductive in a synchronized sequence to cause alternating current to flow through said load.

17. A circuit as claimed in claim 10, in which said inverter circuit is a push-pull inverter, said load comprising two halves connected in series, one of said power terminals being connected to the junction of said load halves, said first pair of transistors being connected between the remaining end of one of said load halves and the remaining power terminal, and said second pair of transistors being connected between the remaining end of the other one of said load halves and said remaining power terminal.

* * * * *